US005708972A

United States Patent [19]

Matsumoto

[11] Patent Number: 5,708,972

[45] Date of Patent: Jan. 13, 1998

[54] VEHICLE COMMUNICATION SYSTEM AND METHOD PROVIDING HIGH RESPONSIVITY TO MULTIPLE POLLING UNITS

[75] Inventor: Manabu Matsumoto, Handa, Japan

[73] Assignee: Nippondenso Co., Ltd., Kariya, Japan

[21] Appl. No.: 600,024

[22] Filed: Feb. 12, 1996

[30] Foreign Application Priority Data

Feb. 17, 1995 [JP] Japan .................................... 7-029248

[51] Int. Cl.$^{6}$ ........................................................ H04B 7/26

[52] U.S. Cl. ................. 455/54.1; 455/33.4; 340/825.54; 340/505; 342/51

[58] Field of Search ................................ 455/33.4, 54.1, 455/103, 296, 89, 56.1; 340/825.08, 825.31, 825.54, 901, 905, 505; 342/50, 51

[56] References Cited

U.S. PATENT DOCUMENTS

| | | | |
|---|---|---|---|
| 5,128,669 | 7/1992 | Dadds et al. | 455/89 |
| 5,266,785 | 11/1993 | Sugihara et al. . | |
| 5,485,520 | 1/1996 | Chaum et al. | 342/50 X |

FOREIGN PATENT DOCUMENTS

| | | |
|---|---|---|
| 609 453 | 8/1994 | European Pat. Off. . |
| 55-116176 | 9/1980 | Japan . |
| 4-303289 | 10/1992 | Japan . |
| 4-315282 | 11/1992 | Japan . |
| 5-314325 | 11/1993 | Japan . |
| 5-324967 | 12/1993 | Japan . |
| 6-131509 | 5/1994 | Japan . |

*Primary Examiner*—Chi H. Pham
*Attorney, Agent, or Firm*—Cushman, Darby & Cushman IP Group of Pillsbury Madison & Sutro LLP

[57] ABSTRACT

To enable communications between a vehicle-installed device and an antenna unit even when the vehicle-installed device passes through an area where neighboring communication areas overlap each other, a toll collection point of a multiple-lane express road is provided with a gantry having antenna units provided corresponding to the lanes. The antenna units are controlled so that neighboring units alternately transmit signals. The antenna units transmit signals according to a predetermined cycle and transmit an unmodulated carrier wave. Upon receiving a signal, a vehicle-installed device generates a response signal by using a control circuit and transmits a signal by reflection, fixes a communication party for further communications and assumes a status of waiting for an interrogation signal. If the vehicle-installed device receives pilot signals repeatedly from a single antenna unit, the device determines that the communications have failed, and cancels the fixation of communication party and invalidates the party to become able to communicate with other antenna units. The vehicle-installed device will communicate with one of the antenna units without a failure even if the device passes through an overlapping area, thus performing tolling processing without a failure.

23 Claims, 12 Drawing Sheets

VEHICLE COMMUNICATION SYSTEM AND METHOD PROVIDING HIGH RESPONSIVITY TO MULTIPLE POLLING UNITS

CROSS-REFERENCE TO RELATED APPLICATIONS

This application is related to and claims priority from Japanese Patent Application No. Hei. 7-29248, incorporated herein by reference.

BACKGROUND OF THE INVENTION

1. Field of the Invention

The present invention relates to a vehicle communication system including a road-installed device having a plurality of antenna units that set predetermined communication areas on a road, and a vehicle-installed device provided in a vehicle for communicating with the road-installed device when the vehicle passing through one of the communication areas.

2. Description of Related Art

In a typical conventional automatic tolling system for toll roads, such as express highways, a vehicle is provided with a communication device (i.e., a vehicle-installed device) that stores a pre-registered identification number or the like, and a place for tolling is provided with another communication device (i.e., a road-installed device) for, when the vehicle passes through a communication area determined by the road-installed device, communicating with the vehicle-installed device to recognize that the vehicle having the registered identification number has passed through the area and stores the event, in order to enable the toll to be collected by other means on the basis of the data recorded.

However, all such conventional systems generally are designed for a single traffic lane and therefore have some difficulties in application to a typical road having a plurality of lanes. A toll data communication system adapted to a road with a plurality of lanes is disclosed in, for example, Japanese Laid-Open Patent Publication No. Hei. 5-324967.

This road toll collecting system using non-contact IC cards is designed to improve the reliability in wireless communications between a road-installed device and non-contact IC cards in a check barrier. In this system, a road device provided in a check barrier is connected to a plurality of antennas that are arranged so that the communication areas of the antennas are shifted from each other in the vehicle traveling direction with respect to each lane, in order to increases the occasions in which communication between the road device and the non-contact IC cards of the vehicles is possible.

This construction eliminates the need for performing an automatic tolling procedure with the individual lanes being separated in a toll road, such as a express highway, where tolling is needed, but performs the automatic tolling procedure for the plurality of lanes as they exist, thereby reducing the manpower required and reducing the incidence of traffic congestion occurring at toll booths.

However, because the above-described conventional system requires that antennas be arranged over a long distance, it is necessary that the antennas be usable even in narrow installation spaces. To avoid this, a construction that employs a similar method but allows the antennas to be arranged over a reduced distance is as follows.

In an example construction, a plurality of antenna units are provided so that communication areas are provided corresponding to individual lanes of a road and so that the communication area of each antenna unit overlaps the neighboring communication area, so that the communication areas of the antenna units cover the entire width of the road without any communication blind area. Different transmission timings are determined for the antenna units whose communication areas overlap each other, and different signal frequencies are determines for the antennas within a range in which vehicle-installed devices can receive the signals, thus enabling reliable communications.

However, because of an expected drawback as described below, this construction has a problem in that the communications between a vehicle-installed device and an antenna unit may fail. An example construction where such a drawback occurs will be described with reference to FIGS. 11 to 13.

FIG. 11 shows a gantry 1 that extends over the width of a road on which vehicles travel from the bottom to the top of the sheet of the drawing. The gantry 1 is provided with two antenna units 2, 3 that define communication areas 4, 5, respectively. The communication areas 4, 5 have an overlap area D in common. If a device 6 installed in a vehicle passes through a peripheral edge area of one of the communication areas, at least one of the antenna units 2, 3 will communicate with the vehicle-installed device. The antenna units 2, 3 transmit pilot signals and interrogation signals and unmodulated carrier waves over the communication areas 4, 5 at different frequencies and different transmission timings.

When the device 6 installed in the vehicle passing though the communication area 4 or 5 receives a pilot signal from the antenna unit 2, the vehicle-installed device 6 determines the antenna unit 2 as a fixed communication party to continue further communications and remains unresponsive to pilot signals from the other antenna unit 3 until the communications end. This construction thus avoids the drawback that when the vehicle-installed device 6 passes through the overlap area D, the device 6 receives pilot signals from both the antenna units 2, 3, thus experiencing radio interference.

However, since the vehicle-installed device 6 modulates the unmodulated carrier wave from the antenna unit 2 with a response signal when transmitting the responsive signal, the transmission area where the signal from the vehicle-installed device 6 can be received by the antenna unit 2, that is, the uplink area 4AU, is made smaller than the vehicle-installed device 6 can receive the signal from the antenna unit 2, that is, the downlink area 4AD, by signal energy attenuation.

If the vehicle-installed device 6 passes through a portion of the overlapping area D that is close to the antenna unit 3 as indicated in FIG. 11, there can be a case where the vehicle-installed device 6 is within the downlink area 4AD of the antenna unit 2 but outside the uplink area 4AU of the antenna unit 2 when receiving a pilot signal from the antenna unit 2.

In such a case, once the vehicle-installed device 6 receives a pilot signal from the antenna unit 2 (see FIGS. 12B and 13B), the vehicle-installed device 6 transmits a pilot response signal and waits for an interrogation signal from the antenna unit 2 (see FIGS. 12C and 13C). On the other hand, the antenna unit 2 cannot receive the pilot signal transmitted from the vehicle-installed device 6 in response to the pilot signal, and will transmit a pilot signal again after a predetermined length of time.

Then, the vehicle-installed device 6 will receive a pilot signal from the antenna unit 2 again and therefore cannot start communications. Since the pilot signal from the antenna unit 3 has been invalidated as indicated in the timing charts of FIGS. 12A–12D, the vehicle-installed device 6 cannot perform communications even though the device 6 should actually communicate with the antenna unit 3 (see FIGS. 13C and 13D).

Similarly, if the vehicle-installed device 6 passes through a peripheral portion of the communication area 4, there can be a case where a reduced level of an interrogation signal from the antenna unit 2 makes it impossible for the vehicle-installed device 6 to continue receiving the signals therefrom even if the vehicle-installed device 6 has once received an interrogation signal from the antenna unit 2 and started communications therewith.

SUMMARY OF THE INVENTION

The present invention is intended to solve the above-stated problems. It is an object of the invention to provide a vehicle communication system that unfailingly enables communications between a vehicle-installed device passing though an overlapping area where the communication areas of a plurality of antenna units on a multi-lane road overlap and one of the antenna units.

A vehicle communication system according to a first aspect of the invention includes a plurality of antenna units provided corresponding to a plurality of communication areas for transmitting pilot signals at predetermined timings and for transmitting interrogation signals at the transmission cycle for the pilot signal when receiving a pilot response signal; a road-installed device for setting different timing of transmitting pilot signals or interrogation signals for at least those of the plurality of antenna units whose communication areas neighbor and overlap each other to cause those antenna units to operate in accordance with the different timing, and for identifying a vehicle passing through one of the communication areas on the basis of a signal received; a vehicle-installed device provided in a vehicle for transmitting a pilot response signal when receiving a pilot signal from one of the antenna units and for, when receiving an interrogation signal from the same antenna unit, transmitting an interrogation response signal in response to the interrogation signal received, to perform communications; and communication control unit provided in the vehicle-installed device for, when receiving a pilot signal from one of the antenna units after transmitting a pilot response signal to the same antenna unit, performing control to invalidate the communications with the antenna unit and to accept a pilot signal from another antenna unit.

According to this aspect of the invention, when a vehicle-installed device passes through an area where a plurality of communication areas overlap and, therefore, receives pilot signals from a plurality of antenna units, the vehicle-installed device starts communications with the antenna unit from which the device first receives a pilot signal and determines the antenna unit as a fixed communication party. If the pilot response signal from the vehicle-installed device can be received by the antenna unit without a failure, the vehicle-installed device receives an interrogation signal transmitted from the antenna unit in response to the pilot response signal and performs subsequent communication processing. However, if the pilot response signal from the vehicle-installed device does not reach the antenna unit, the antenna unit determines that there is no response and transmits a pilot signal over its communication area again.

As a result, the vehicle-installed device receives a pilot signal from the antenna unit again and, therefore, cannot start the subsequent communications. However, the communication control unit then invalidates the communications with that antenna unit to allow the device to receive pilot signals from other antenna units. The communication control unit thus quickly switches communications so that the vehicle-installed device can communicate with other antenna units while the vehicle-installed device is within the communication areas, thereby achieving unfailing communications between the vehicle-installed device and one of the antenna units even when the vehicle-installed device passes through an overlapping area.

Further, the vehicle communication system may be constructed so that if the communication control unit receives no interrogation signal from an antenna unit within a predetermined length of time after transmitting a response signal for a pilot signal or an interrogation signal from the same antenna unit, the communication control unit invalidates the communications with the antenna unit and accepts a pilot signal from another antenna unit.

According to this aspect of the invention, when the vehicle-installed device enters a communication area and receives a pilot signal, the vehicle-installed device transmits a pilot response signal and waits for an interrogation signal to be transmitted. An antenna unit transmits an interrogation signal immediately after receiving the pilot response signal in response to the pilot signal. It is thus assured that the vehicle-installed device will communicate with one of the antenna units even when the vehicle-installed device passes through an overlapping area.

After that, the antenna unit transmits an interrogation signal and, in response to this signal, the vehicle-installed device transmits a response signal for further communications. However, the transmission of an interrogation signal may fail, for example, when the vehicle-installed device is passing through a peripheral portion of the communication area. In such a case, the communication control unit enables the device to receive pilot signals from other antenna units since the communication control unit invalidates the communications with an antenna unit if no interrogation signal is received within a predetermined length of time while the vehicle-installed device is ready to transmit a response signal in response to an interrogation signal.

Thus, if the vehicle-installed device goes out of the communication area of the currently communicating antenna unit and becomes unable to continue the communications therewith, the vehicle-installed device quickly starts communications with another antenna unit. Communications between the vehicle-installed device and one of the antenna units is thus assured.

It is also an object of the present invention to provide a vehicle-installed unit for use in systems as described above and to provide a method for operating such a vehicle-installed unit.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

A first embodiment in which the present invention is applied to a toll charging system for an express highway will be described hereinafter with reference to FIGS. 1 to 7D.

Figure 2:
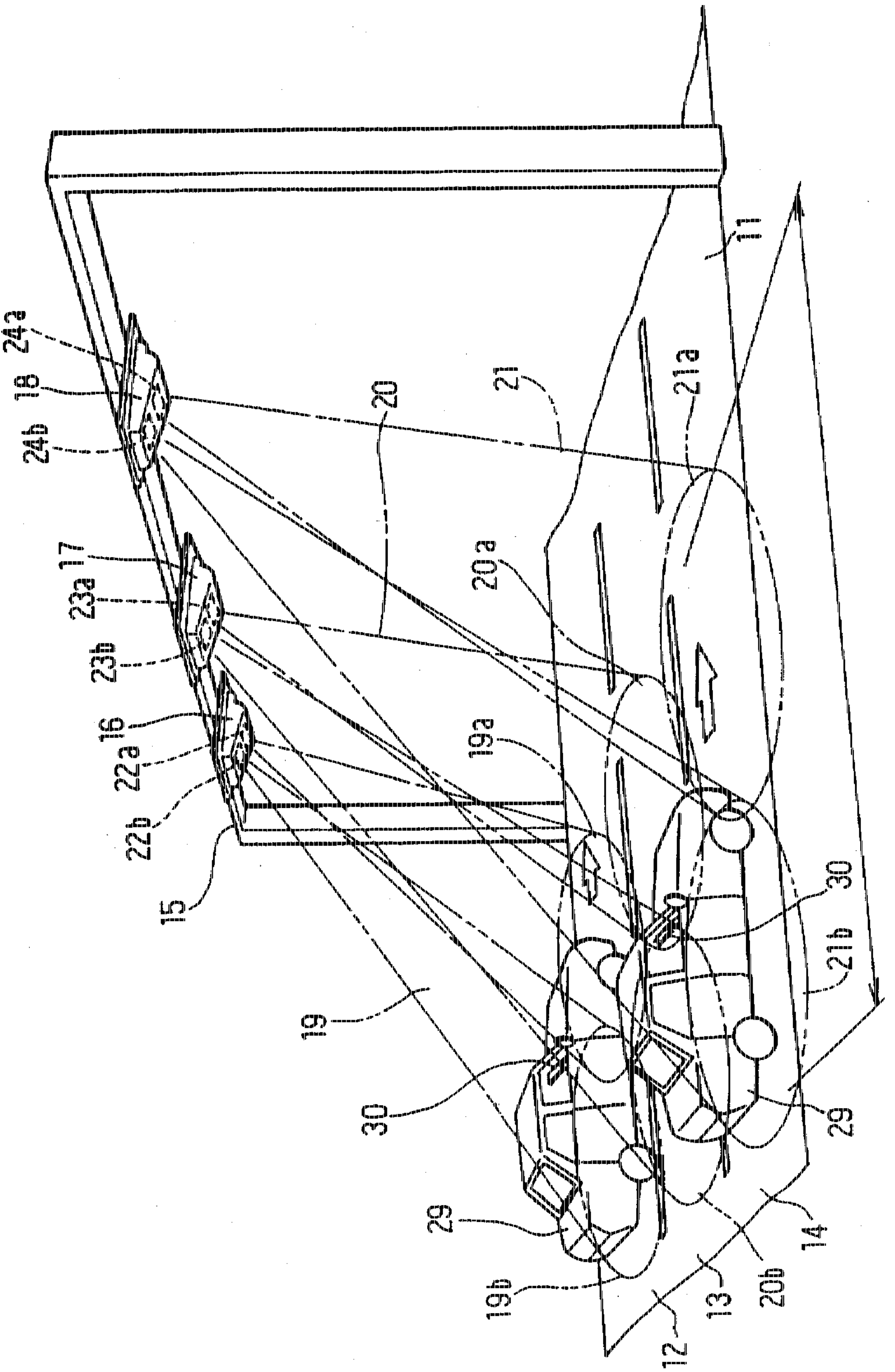
FIG. 2 is an exterior perspective view of the overall construction of the first embodiment.

Referring first to FIG. 2 which illustrates an overall view of the system, a toll express road 11 (only lanes having one direction of travel are shown has three lanes 12, 13, 14. A predetermined toll charging point is provided with a gantry 15 extending over the road 11. The gantry 15 serves as a road-installed device. The gantry 15 has antenna units 16–18 directed downward corresponding to the respective lanes 12–14 to determine communication areas 19–21.

The communication areas 19–21 are set in such a direction from the respective antenna units 16–18 that they cover approaching traffic (represented by motor vehicles 29). According to this embodiment, the antenna unit 16 has antenna elements 22*a*, 22*b* that determine communicative areas 19*a*, 19*b*, respectively, that together provide the communication area 19 as a result. Similarly, the antenna unit 17 has antenna elements 23*a*, 23*b* that determine communicative areas 20*a*, 20*b*, respectively, that together provide the communication area 20 as a result. The antenna unit 18 has antenna elements 24*a*, 24*b* that determine communicative areas 21*a*, 21*b*, respectively, that together provide the communication area 21 as a result.

Figure 3:
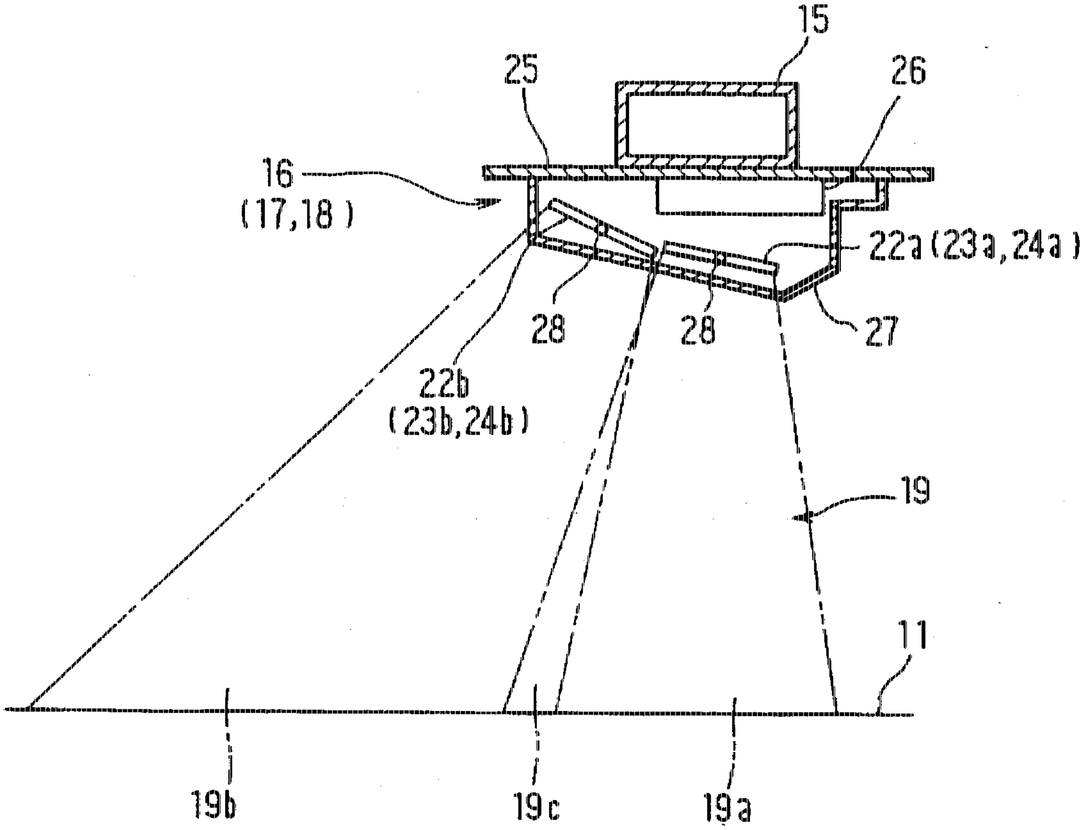
FIG. 3 is a vertical cross-sectional view of a road-installed device according to the first embodiment.

As shown in FIG. 3, each of the antenna units 16–18 has a water-tight construction comprising (using antenna unit 16 as an example) a base 25 connected to the lower surface of the gantry 15, the antenna elements 22*a*, 22*b* and a control circuit section 26 mounted on the base 25, and a plastic cover 27 that is permeable to radio waves. The control circuit section 26 includes an electrical construction as described below that control the driving of the antenna elements 22*a*, 22*b* for transmitting and receiving operations. The antenna elements 22*a*, 22*b* are rotatably supported by support shafts 28 so that the orientation of the radiation surface of each antenna element 22*a*, 22*b* can be adjusted. Although not shown in the figures, each antenna element is also rotatably supported with respect to a direction perpendicular to the support shaft 28 by a well-known structure so that the orientation of the radiation surface can also be adjusted with respect to directions perpendicular to the support shaft 28.

The communicative areas 19*a*, 19*b* depend on the angles of the radiation surfaces of the antenna elements 22*a*, 22*b*, respectively, that together provide the communication area 19 as a result, as described above. The two communicative areas are defined to form an overlapping area 19*c*. Thus, the communicative areas 19*a*, 19*b* are contiguous and leave no space therebetween (similarly, the other antenna elements 23*a*, 23*b*, 24*a*, 24*b* produce overlapping areas 20*c*, 21*c*). The antenna elements 22*a*, 22*b* output microwaves at frequencies different from each other for communication with vehicle-installed devices.

Each of the antenna elements 22*a*, 22*b*, 23*a*, 23*b*, 24*a* and 24*b* is a micro-strip type array antenna element produced by forming eight patches of a generally square shape on one of the side surfaces of a printed circuit board and connecting the patches by transmission lines to the feeding terminal. The printed circuit board used is formed of a resin material and printed on both sides (i.e., it is a two-side printed circuit board). The resin material used has a dielectric constant having such a temperature expansion characteristic that the variation within the operating temperature range (for example, with the upper limit being about 120° C.) is a predetermined level or lower (for example, 1% or lower). For example, a BT resin material or a glass epoxy material has been used.

Although a typical array antenna comprising many patches exhibits side lobes, the antenna elements 22*a*, 22*b* reduce side lobes by adjusting the impedance of the transmission lines to prevent communication impossiblity areas from occurring in the communication area. For example, each of the antenna elements 22*a*, 22*b* is designed to cover substantially the same area within a height range of about 1 to 2 meters; that is, the height range through which the vehicle-installed device 30 passes.

Figure 1:
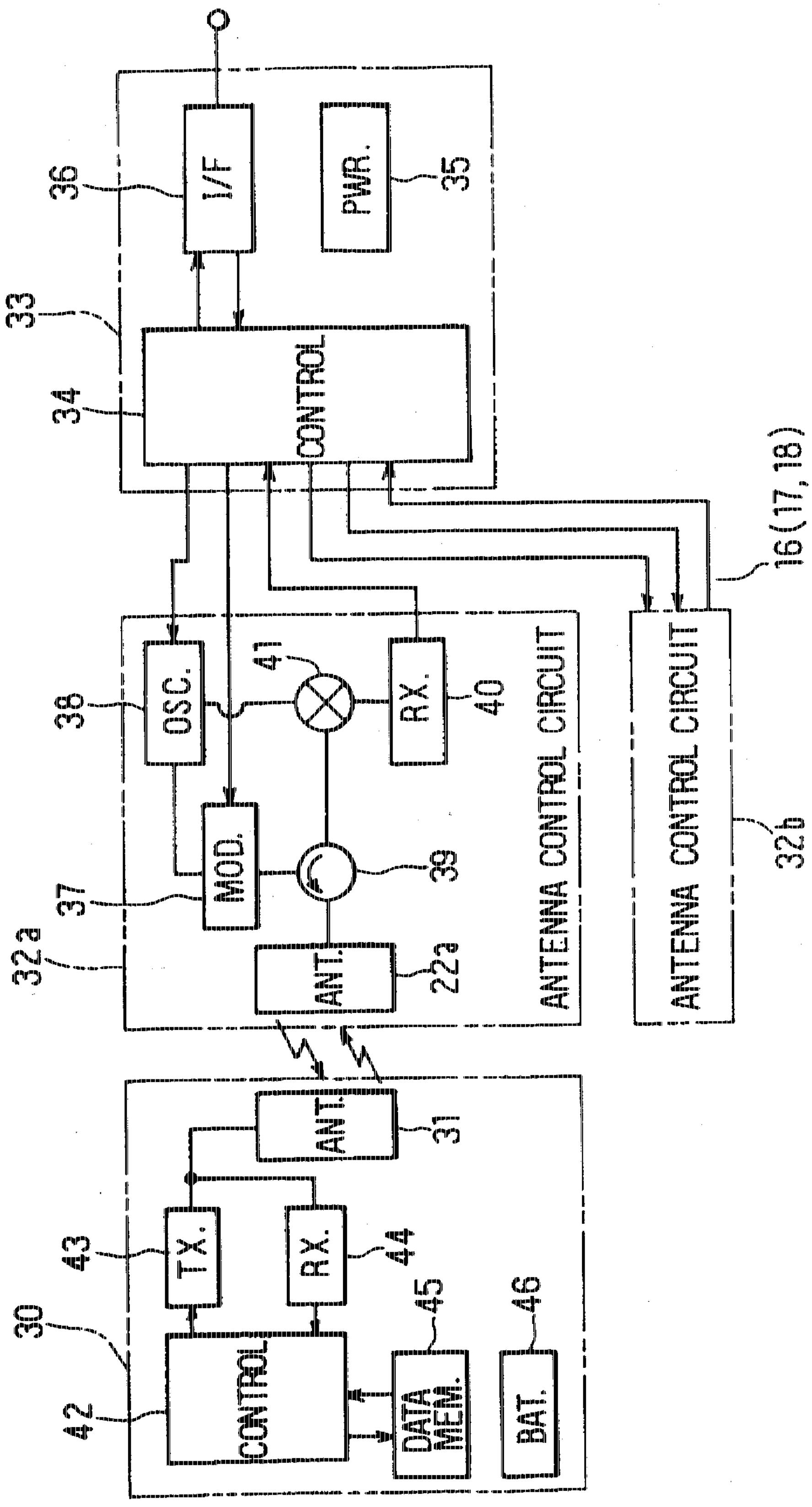
FIG. 1 is a block diagram of a first preferred embodiment of the invention.

The motor vehicles 29 traveling on the express road 11 have devices 30 (shown in FIG. 2) installed close to their dash boards. Each vehicle-installed device 30 has an antenna 31 for receiving pilot signals and interrogation signals from the antenna units 16–18 as shown in FIG. 1. The antenna 31 is also a micro-strip type antenna comprising two patches of a generally square shape formed on a printed circuit board as used for the antenna element 22*a*. The two patches are separate patches provided for transmission and reception.

The antenna 31 reflects an unmodulated carrier wave from the antenna unit 16 while modulating the carrier wave with a response signal for transmission of a response signal. That is, the vehicle-installed device 30 transmits a response signal by receiving an unmodulated carrier wave from the antenna units 16–18 within the communication areas 19–21 and by reflecting it as a response signal while receiving it.

The electrical structure of the system will now be described with reference to FIG. 1. First, the similarly constructed antenna units 16–18 will be described by referring to the antenna unit 16 shown in FIG. 1. A control section 33 for controlling control circuits 32*a*, 32*b* provided respectively for the antenna elements 22*a*, 22*b* includes a control circuit 34, a power source circuit 35, and interface circuit 36 for exchanging data with an external device.

In each of the control circuits 32*a*, 32*b* provided for the antenna elements 22*a*, 22*b*, a modulating circuit 37 modulates a carrier wave, that is, an oscillation output from an oscillator 38 of a predetermined frequency, with an interrogation signal or a pilot interrogation signal provided by the control circuit 34, and outputs it to the antenna element 22*a* via a circulator 39.

A reception circuit 40 for signal processings, such as demodulation, is connected to a mixer 41. The mixer 41 receives an oscillation output from the oscillator 38 and also receives from the antenna element 22*a* a radio wave signal corresponding to a response signal. The carrier wave and the radio wave signal corresponding to the response signal are mixed by the mixer 41 and then outputted to the reception circuit 40. The reception circuit 40 demodulates the composite signal into a response signal and outputs the signal to the control circuit 34.

Figure 4:
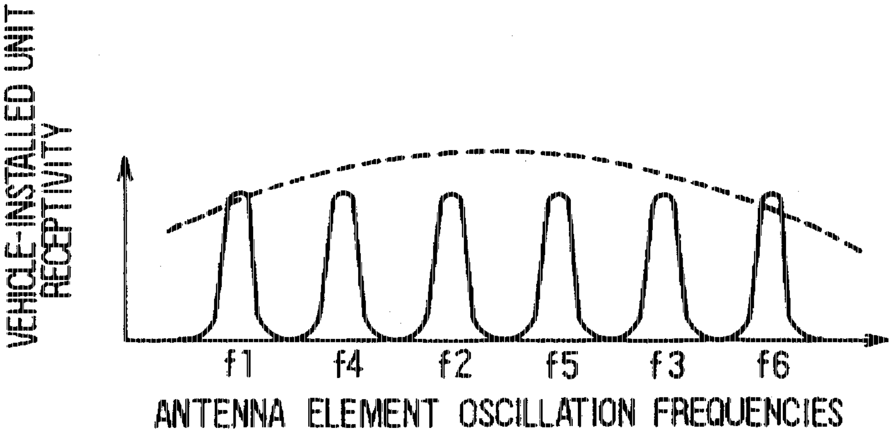
FIG. 4 indicates the frequencies assigned to the antenna elements and the reception frequency characteristics of a vehicle-installed device according to the first embodiment.
Figure 5:
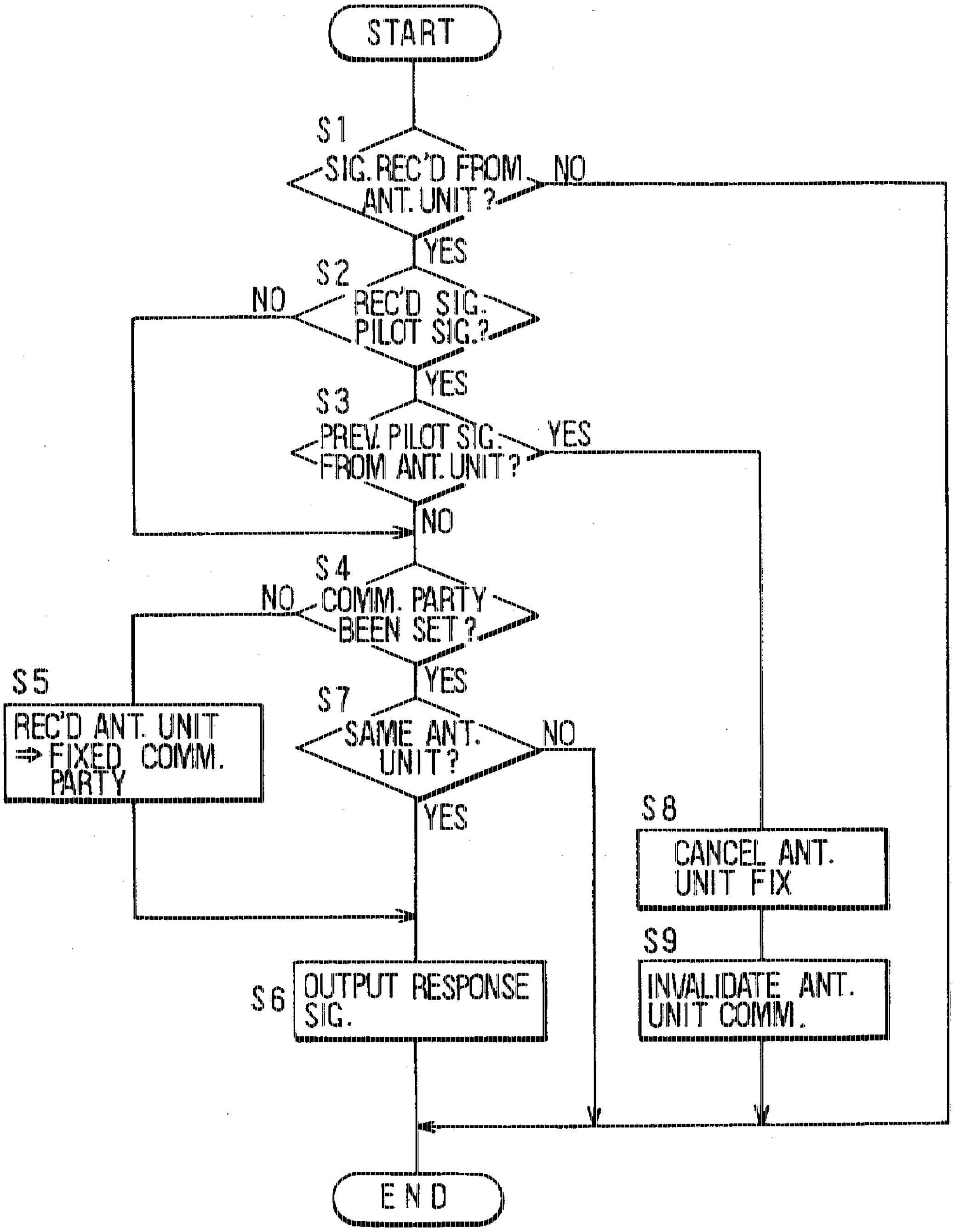
FIG. 5 is a flowchart illustrating the control operation performed by the vehicle-installed device upon signal reception in the first embodiment.

Each of the oscillators 38 provided respectively for the antenna elements 22*a*–24*b* outputs the carrier wave in the form of quasi-microwaves within a predetermined frequency range assigned thereto, for example, in the 2.45 GHz band. As indicated in FIG. 4, each oscillator 38 is assigned with one of the frequencies f1 to f6 that are different narrow frequency ranges within the aforementioned frequency band and output the assigned frequency. On the other hand, the vehicle-installed device 30 is designed to receive all the signals corresponding to the oscillating frequencies f1–f6 of the oscillators 38, as described later.

The thus-constructed antenna units 16–18 receive timing signals driven corresponding to the respective antenna elements 22*a*–24*b* by a control device (not shown) connected thereto by the interface circuit 36. The timing signals are determined such that the neighboring antenna units 16, 17 and 17, 18 output pilot interrogation signals and interrogation signals at timings that are shifted half an interrogation timing cycle from each other. Thereby, if the vehicle-installed device 30 of a motor vehicle passes through, for example, an area where the communication areas 19, 20 overlap, the vehicle-installed device 30 will not simultaneously receives pilot signals from two antenna units 16, 17.

In the vehicle-installed device 30, a control circuit 42 constituting the communication control unit includes a ROM and a RAM. According to a pre-stored program, the control circuit 42 outputs various data, such as the vehicle's identification code, in response to a pilot signal or an interrogation signal. The control circuit 42 is connected to the antenna 31 via a transmission circuit 43, and also via a reception circuit 44.

The transmission circuit 43 performs modulation in accordance with a response signal to modulate the unmodulated carrier wave received by the antenna 31 in order to perform transmission, and the reception circuit 44 demodulates the radio wave received by the antenna 31 into an interrogation signal and supplies the signal to the control circuit 42, thus forming a semi-double construction. The control circuit 42 is connected to a data memory 45, that is, a read/write non-volatile memory. A battery 46 supplies power to the circuits provided in the vehicle-installed device 30.

Although not shown in the Figures, the control circuit 42 is provided with a starting circuit that starts the entire device to switch from "sleep status" to "wake-up status" to operate for communications and, when the communications end, switches the entire device to the "sleep status" to stand ready for reception of a signal from the outside. This construction minimizes the load on the battery 46 when communications are not performed.

The operation of this embodiment will be described with reference to FIGS. 5–7D. In a normal case where it is assumed that motor vehicles travel separately in lanes 12–14, the antenna units 16–18 perform communications with the vehicle-installed devices 30 of the motor vehicles traveling through their respective communication areas 19–21 to exchange tolling data without a failure as in the conventional art. When the starting circuit switches the vehicle-installed device 30 to "wake-up status", that is, the device is started, the control circuit 42 executes the program illustrated by the flowchart of FIG. 5 for communications.

In normal operation for communications, the vehicle-installed device 30 operates as described below when entering one of the communication areas 19–21 and receives a pilot signal PLT. First, when the control circuit 42 is started to start the program, the control circuit 42 detects and stores the location code and the code number of the gantry 15 included in the received pilot signal PLT, and then determines whether the received signal originates from any one of the antenna units 16–18 (step S1). If the affirmative determination has been made, the control circuit 42 determines whether the received signal is a pilot signal PLT (step S2). If it is a pilot signal PLT, the control circuit 42 makes an affirmative determination and proceeds to step S3 to determine whether the pilot signal PLT is the first pilot signal received from the antenna unit, in other words, whether the pilot signal PLT is from an antenna unit from which a pilot signal PLT was also received the last time (step S3). If the determination is negative, the operation proceeds to step S4 and then to step S5.

In step S5, the control circuit 42 determines the antenna unit that has transmitted the pilot signal PLT as a fixed communication party for the later communications, and set up a status to reject pilot signals PLT from the other antenna units if any one is received. In this status, the control circuit 42 generates a pilot response signal in response to the pilot signal PLT, and reflects the unmodulated carrier wave continually transmitted from the antenna unit by modulating it with the generated pilot response signal RSP thus transmitting the pilot response signal RSP. The pilot response signal RSP carries an identification code that has been registered as a code specific to the vehicle-installed device 30.

After that, the control circuit 42 sequentially receives interrogation signals RC, WC from the antenna unit and thereby exchanges signals to perform communications. When receiving an end signal END at the end of communications, the control circuit 42 stops the communication operation and returns to the "sleep status" The road-installed device then determines the vehicle 29 or the driver registered on the basis of the vehicle-installed device 30 to go on to toll collection processing.

When the vehicle-installed device 30 communicates with, for example, the antenna unit 16, the antenna unit 16 transmits a vehicle-installed device data request signal RC1 as an interrogation signal following the pilot signal PLT. The vehicle-installed device data request signal RC1 carries a code indicating the location, the code number of the gantry, and the identification code registered corresponding to the vehicle-installed device 30, thereby causing only the vehicle-installed device 30 to perform a communication operation following the reception of the signal.

When receiving the vehicle-installed device data request signal RC1, the vehicle-installed device 30 reads out data, such as data on account balance, to generate a card read signal RD1, and then transmits the signal to the antenna unit 16 in the manner as described above. When the antenna unit 16 receives the read signal RD1, the antenna unit 16 transmits to the vehicle-installed device 30 predetermined data required for tolling data processing as a write signal WD1. The write signal WD1 carriers a toll instruction code, toll amount data, a location code number, the gantry code number, the identification code of the vehicle-installed device 30, operation time data, etc. If the response signal RS1 from the vehicle-installed device 30 is abnormal, the antenna unit 16 execute a predetermined abnormality processing routine.

When the vehicle-installed device 30 receives the write signal WD1, the vehicle-installed device 30 performs predetermined writing processing. The vehicle-installed device 30 then transmits a write end signal END1 carrying a location code signal, the gantry code number, and the identification code of the vehicle-installed device 30 in the manner as described above. Upon receiving the write end signal END 1, the antenna unit 16 transmits an end acknowledge signal ACK1 to the vehicle-installed device 30 to inform of reception of the write end signal END1. Upon receiving the end acknowledge signal ACK1, the vehicle-installed device 30 determines that communications have been completed. The starting circuit stops to switch the device 30 to the "sleep status", that is, the same status before the starting of communications.

If the vehicle-installed device 30 receives a pilot interrogation signal again in the communication areas 19–21 of the road-installed device 15 after it has completed communication processing, the vehicle-installed device 30 ignores the signal with reference to the data on communication results stored, thereby avoiding interfering with the communications by other vehicle-installed devices. This function prevents the vehicle-installed device 30 from repeating communications within the same communication area 19 or the communication areas of the same gantry 15, thus eliminating the possibility of double charging of toll.

For actual toll processing, the vehicle-installed device 30 is designed to accommodate an IC card. After passing through the communication area 16, the vehicle-installed device 30 writes in the IC card through an IC card interface the data corresponding to the amount obtained by subtracting the toll amount data transmitted during the communications from the balance on the basis of various data specified by the write signal WD1.

Figure 6:
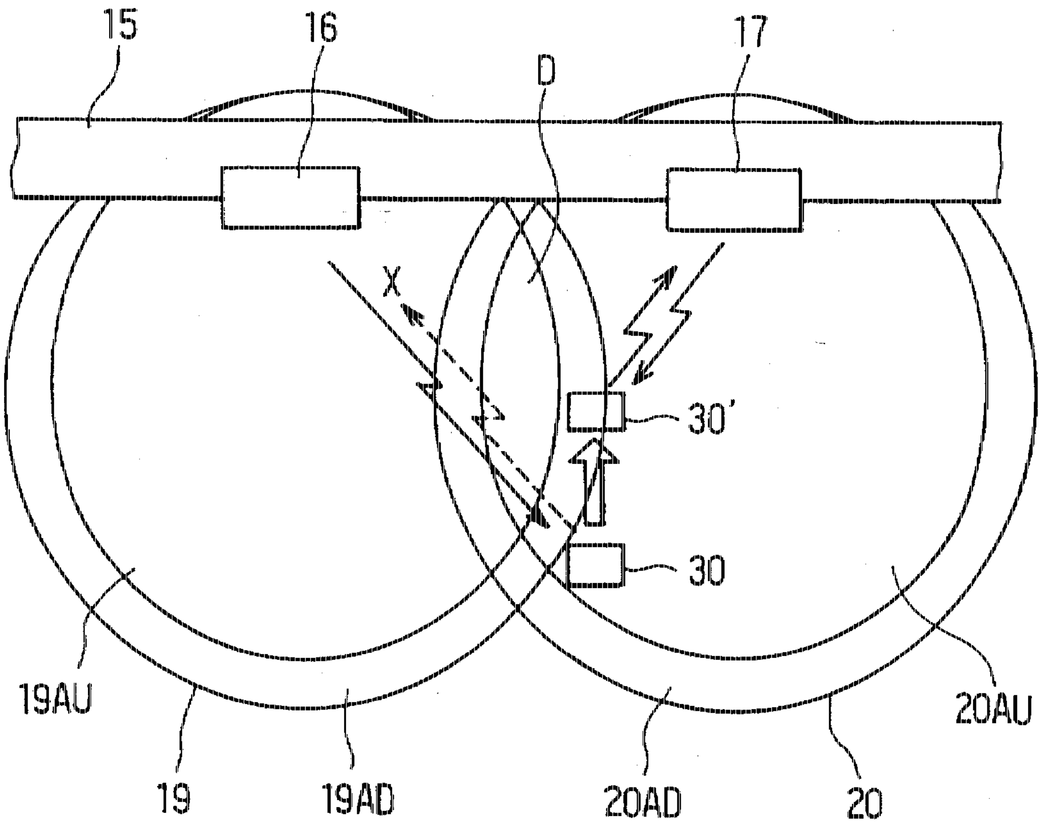
FIG. 6 illustrates positional relationships when the vehicle-installed device passes through an overlapping area between two antenna units in the first embodiment.

Assurance of reliable communication processing will be described with reference to the case where a communication impossibility state may occur as described in the Description of Related Art above. It is assumed that the vehicle 29 equipped with the vehicle-installed device 30 passes a portion of the overlapping area D close to the antenna unit 17 as illustrated in FIG. 6. More specifically, it is assumed that the vehicle-installed device 30 passes through a portion of the overlapping area D that is inside the downlink area 19AD of the antenna unit 16 but outside the uplink area 19AU and that is inside the uplink area 20AU of the antenna unit 17.

Figures 7A, 7B, 7C, 7D:
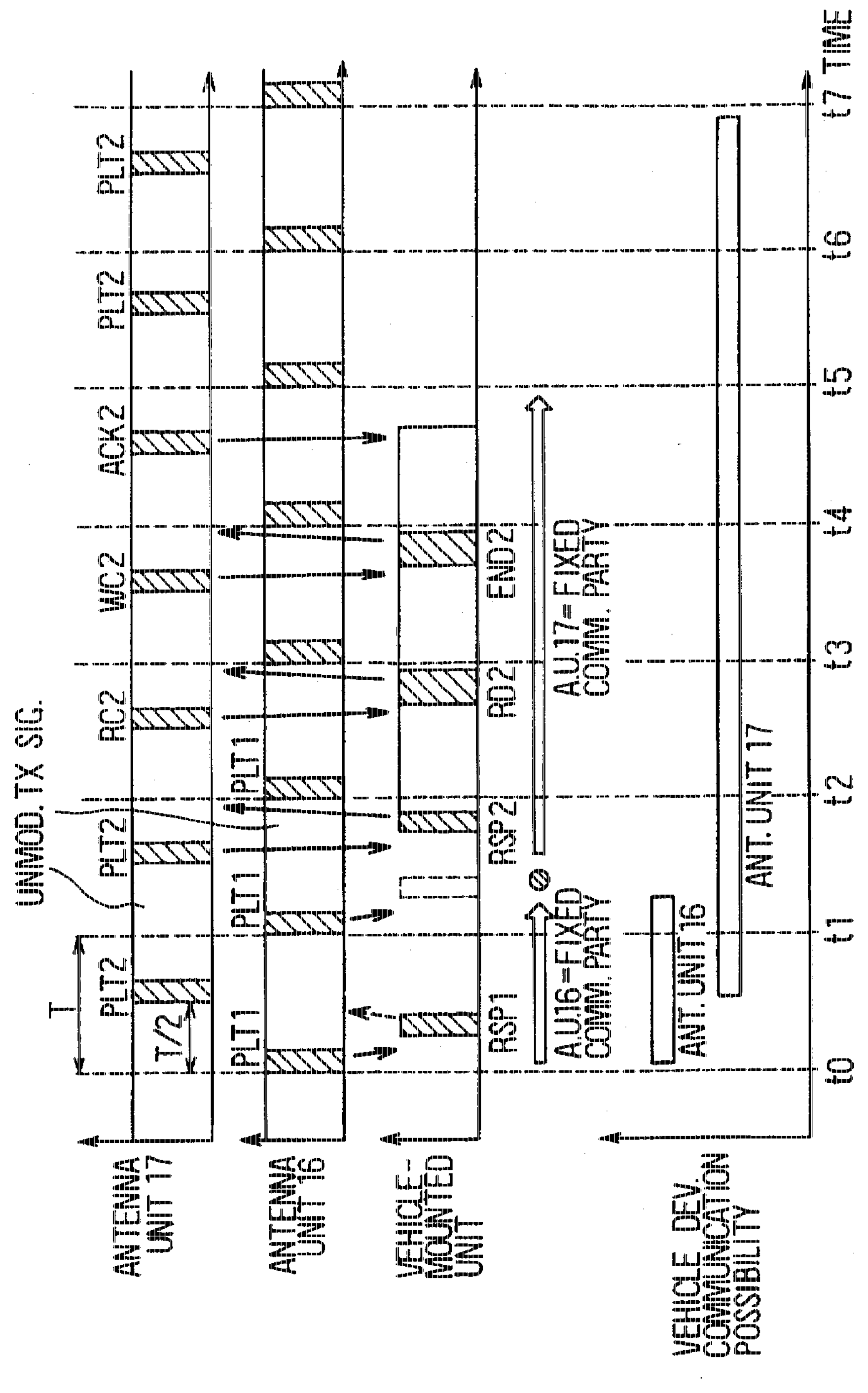
FIGS. 7A–7D are timing charts illustrating the status of communications between the vehicle-installed device and the antenna units in the first embodiment.

As shown in FIG. 7B, the antenna unit 16 repeatedly outputs pilot signals PLT1 at time t0–t7 in the transmission cycle T. On the other hand, as shown in FIG. 7A, the antenna unit 17 repeatedly outputs pilot signals PLT2 in the same transmission cycle T as that of the neighboring antenna unit 16 but at a time shifted by T/2, that is, the half the transmission cycle T.

If the vehicle-installed device 30 receives a pilot signal PLT1 from the antenna unit 16, the control circuit 42 is switched from the "sleep status" to the "wake-up status" by operation of the starting circuit and thus starts operating. The control circuit 42 starts the program illustrated in FIG. 5 and thus executes steps S1–S6 as described above to transmit a pilot response signal RSP1 in response to the pilot signal PLT1 (see FIG. 7C). In this condition, the control circuit 42 has fixed its communication party to the antenna unit 16 for further communications (step S5). Therefore, if the vehicle-installed device 30 receives an interrogation signal from an antenna unit other than the currently fixed communication party, that is, the antenna unit 16, the control circuit 42 makes a negative determination in step S7 to end the program.

However, since the vehicle-installed unit 30 is located outside the uplink area 19AU of the antenna 19 although it is inside the communication area 19 of the antenna unit 19 in this case, the pilot response signal RSP1 from the vehicle-installed device 30 does not reach the antenna unit 16. As a result, the antenna unit 16 transmits the pilot signal PLT1 again at the next transmission timing.

As the vehicle-installed device 30 receives the pilot signal PLT1 from the antenna unit 16 again, the control unit 42 makes a negative determination in step S3 following steps S1 and S2. The control circuit then cancels the fixation of the communication partner (step S8) and invalidates the communications with the antenna unit 16 (step S9). The vehicle-installed device 30 thus cancels the determination of the antenna 16 as a fixed communication partner since the antenna unit did not transmit an interrogation signal in response to the pilot response signal RSP1, and switches to the status of waiting for a pilot signal from another antenna unit. If the vehicle-installed device 30 receives a pilot signal PLT1 from the antenna unit 16 later on, the control circuit 42 will invalidate the communications therewith by making a negative determination in step S3 as described above.

Since the vehicle-installed device 30 is still passing through the overlapping area D, the vehicle-installed device 30 will receive a pilot signal PLT2 from the antenna unit 17. When this happens, the vehicle-installed device 30 starts communications with the antenna unit 17 as described above. In this manner, the vehicle-installed device 30 cancels the determination of the antenna unit 16 as a fixed communication partner since the communications are impossible, and quickly becomes able to communicate with the other antenna unit 17, thereby performing toll processing without a failure (see FIG. 7D).

According to this embodiment, if the vehicle-installed device 30 receives a pilot signal PLT from one of the antenna units 16–18, transmits a pilot response signal RSP and then receives a pilot signal PLT from the same antenna unit again, the control circuit 42 cancels the determination of the antenna unit as a fixed communication party and validates the communications with other antenna units. The embodiment thus performs toll processing without a failure even if the vehicle-installed device 30 passes through the overlapping area D, as a result of the vehicle-installed device 30 quickly switching the communication party when the communications with the current communication party becomes impossible and starting communications with another antenna.

FIGS. 8 to 10D illustrate a second embodiment of the invention. The features distinguishing the second embodiment from the first embodiment will be described. The second embodiment is designed for reliable communications even in the case where the vehicle-installed device 30 transmits a pilot response signal in response to a pilot signal from the antenna unit 16 and then receives an interrogation signal RC1 to start the communication processing while passing through the overlapping area D as illustrated in FIG. 6, but the vehicle-installed device 30 leaves the communication area 19 of the antenna unit 16 before receiving an interrogation signal WC1 following the response signal RD1 from the vehicle-installed device 30. In this case, the vehicle-installed device 30 could also pass through the communication area 20 of the antenna unit 17 and pass across the gantry 15 before completing the communication processing. This embodiment is designed to prevent such an undesired event.

Figure 8:
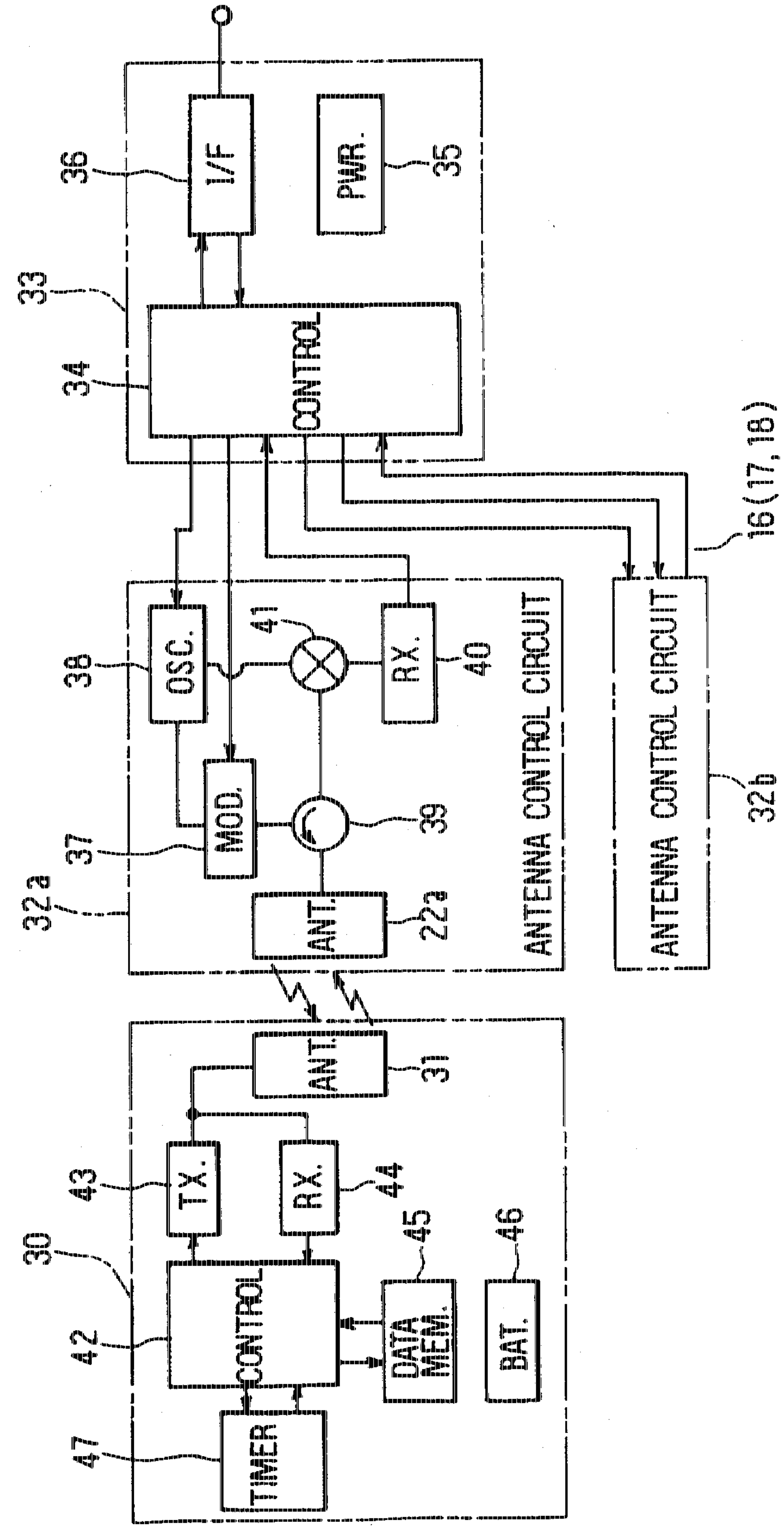
FIG. 8 illustrates a second embodiment of the present invention.

Referring to FIG. 8, the vehicle-installed device 30 has a circuit construction in which a control device 42 is connected to a timer circuit 47. When the control circuit 42 starts the communication processing as in the first embodiment, the control circuit 42 operates the timer circuit 47 as follows. The control circuit 42 operates the timer circuit 47 upon outputting a response signal in step S6 of the above-described program (see FIG. 5) executed in accordance with the pilot signal PLT1 from, for example, the antenna unit 16 (see FIG. 10B).

Figure 9:
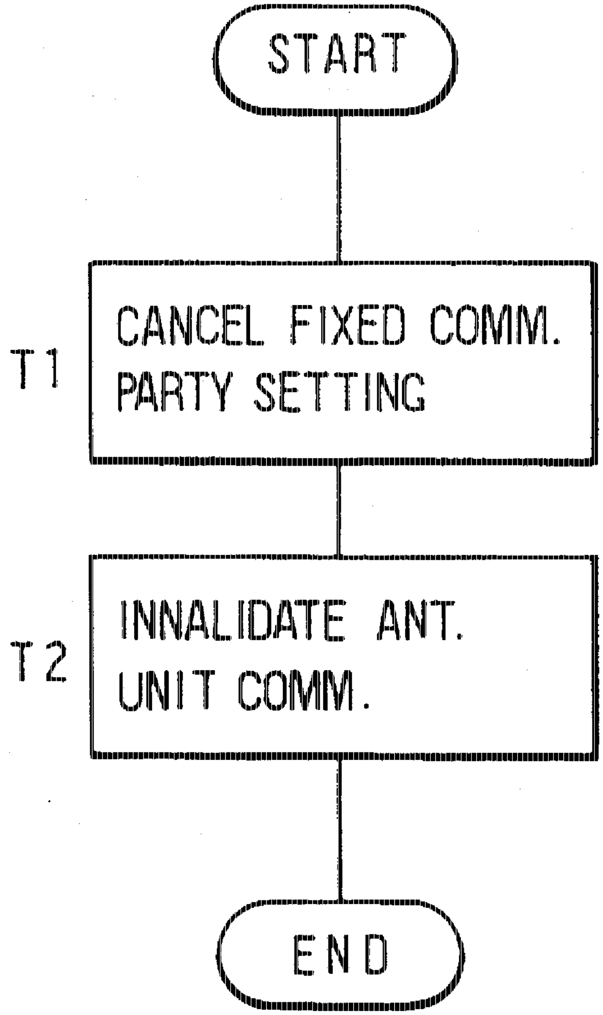
FIG. 9 is a flowchart of a timer interruption program according to the second embodiment.
Figures 10A, 10B, 10C, 10D:
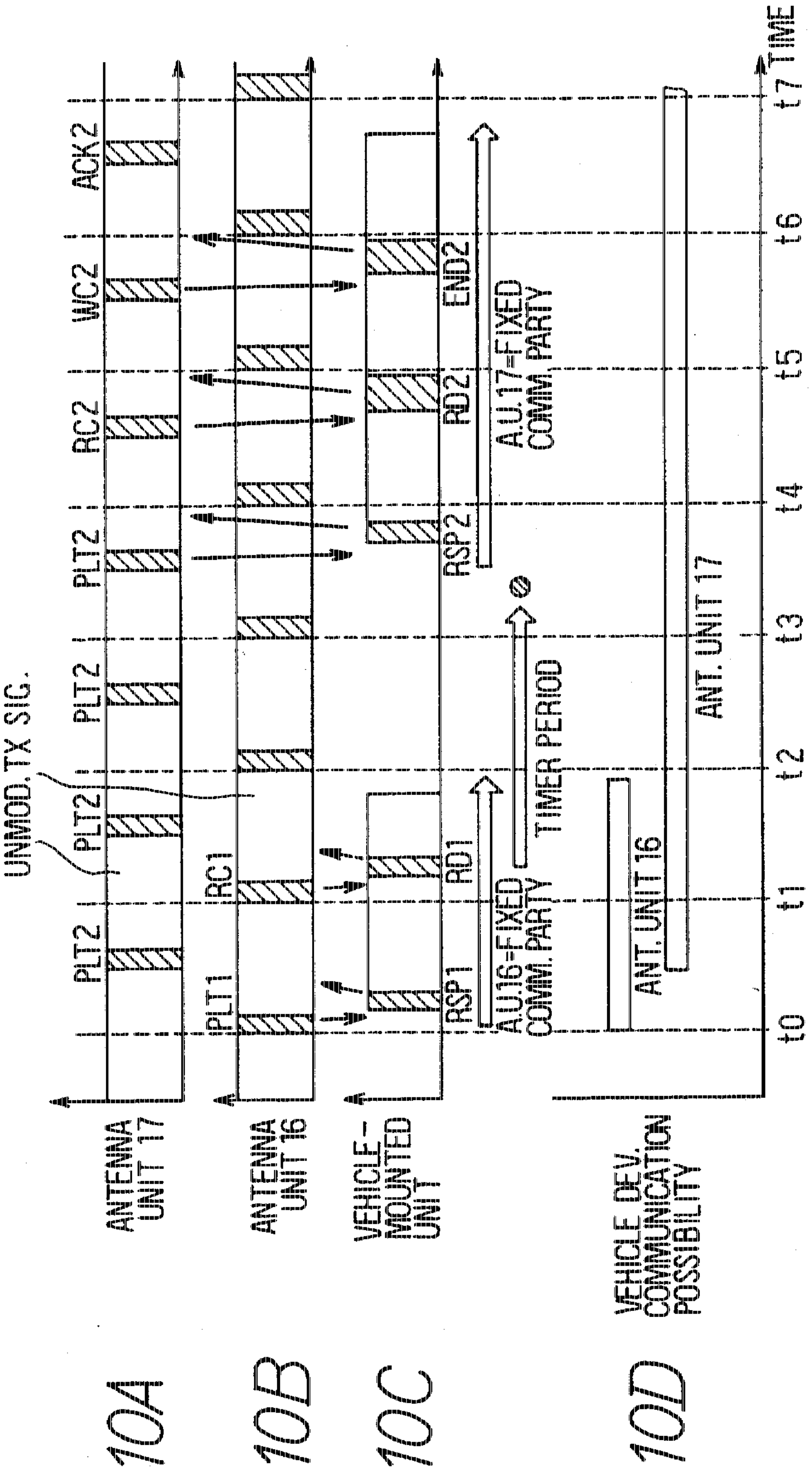
FIGS. 10A–10D illustrate the status of communications between the vehicle-installed unit and the antenna units in the second embodiment.
Figure 11:
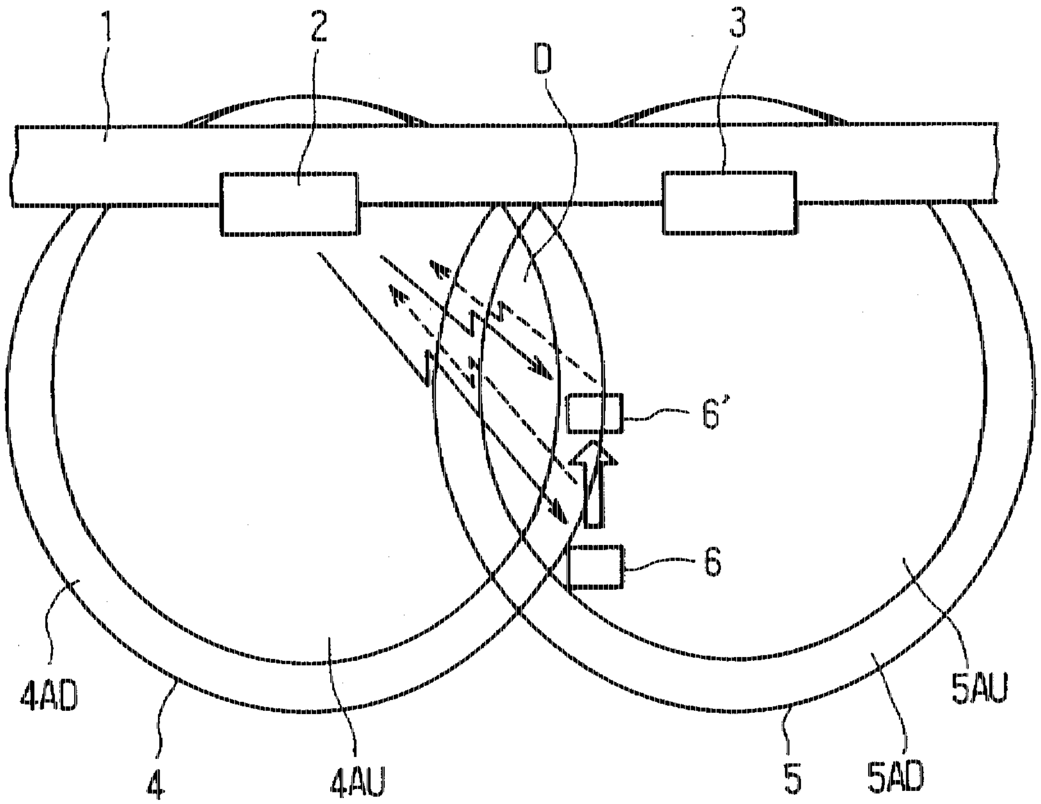
FIG. 11 PRIOR ART
FIG. 11 illustrates an overlapping antenna unit relationship according to the prior art.
Figures 12A, 12B, 12C, 12D:
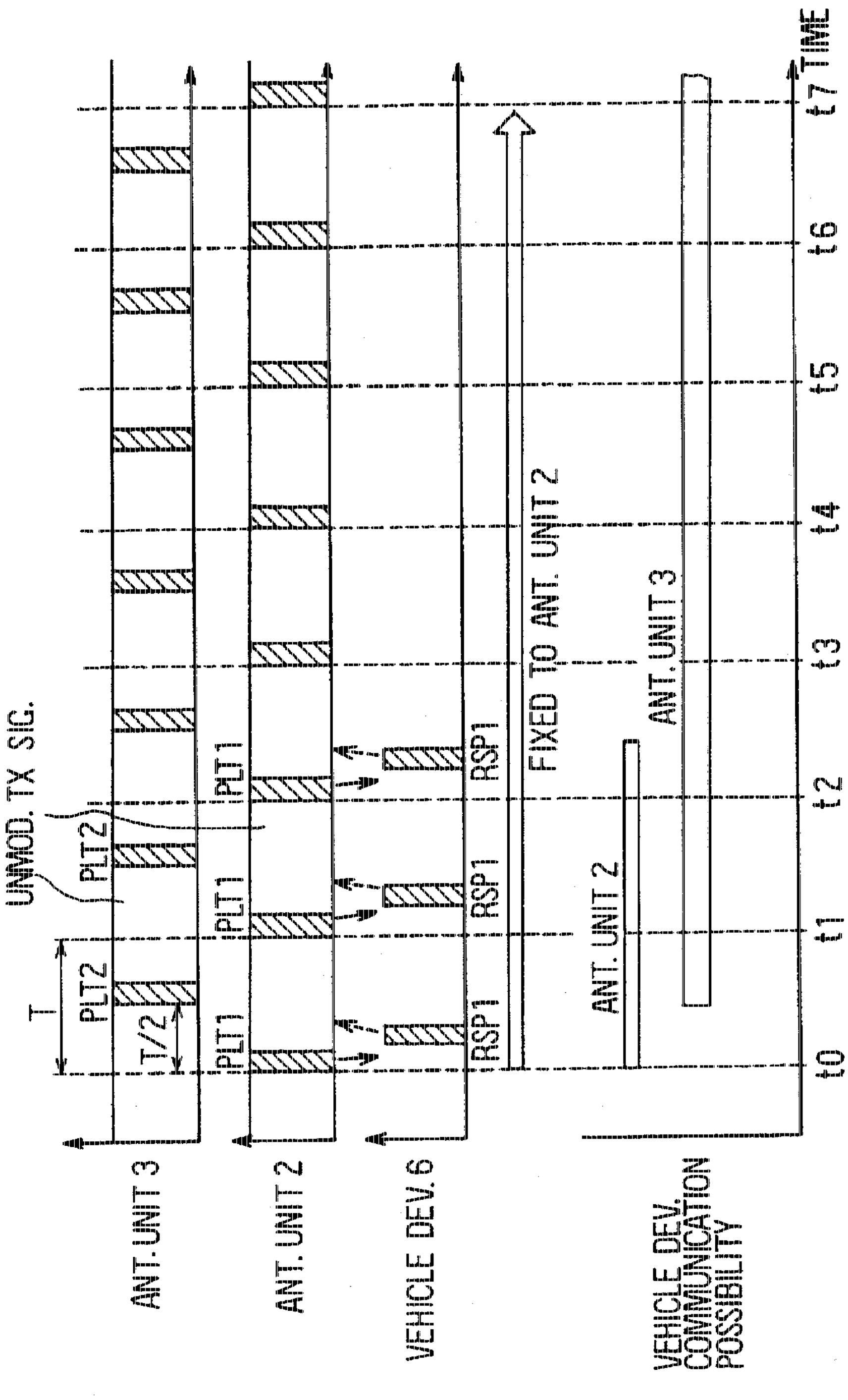
FIG. 12A PRIOR ART
FIG. 12B PRIOR ART
FIG. 12C PRIOR ART
FIG. 12D PRIOR ART
FIGS. 12A–12D illustrate a communication impossiblity state occurring according to the prior art.
Figures 13A, 13B, 13C, 13D:
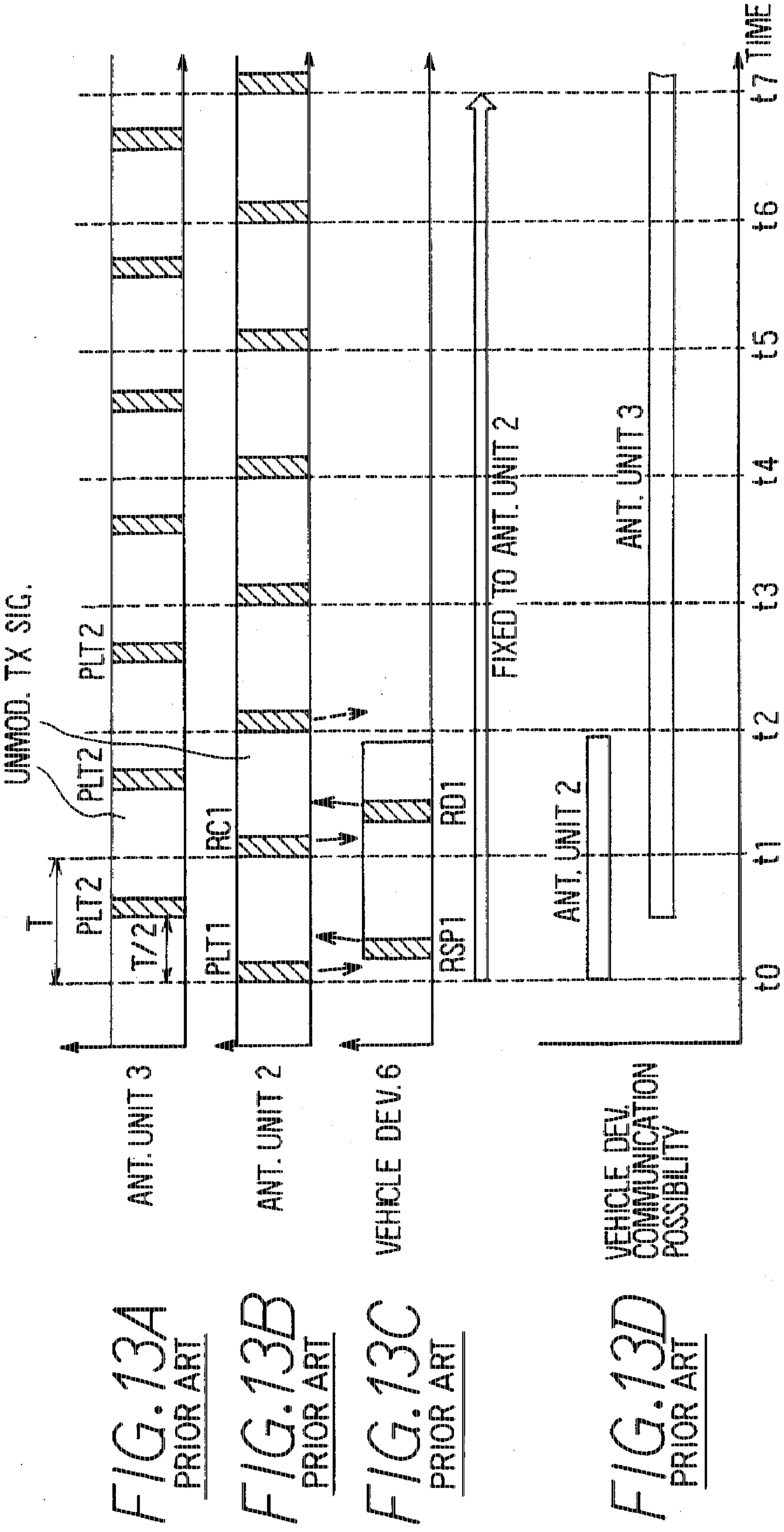
FIG. 13A PRIOR ART
FIG. 13B PRIOR ART
FIG. 13C PRIOR ART
FIG. 13D PRIOR ART
FIGS. 13A–13D illustrate a communication impossiblity state occurring according to the prior art.

The timer circuit 47 counts time starting at the time of transmission of a response signal for an interrogation signal and ending when a predetermined wait time TW has elapsed (see FIG. 10C). Upon detecting elapse of the wait time TW, the timer circuit 47 outputs an interruption signal to the control circuit 42. Receiving the interruption signal from the timer circuit 47, the control circuit 42 executes a timer interruption program illustrated in FIG. 9.

Until the timer interruption occurs, the control circuit 42 fixes the antenna unit 16 as a fixed communication party and cancels interrogation signals from other antenna units if any are received. If the next interrogation signal is received from the fixed communication partner, that is, the antenna unit 16, during this period, the control circuit 42 makes an affirmative determination in step S7 of the main communication program (see FIG. 5) and proceeds to step S6. The timer circuit 47 is thereby started again.

On the other hand, if no interrogation signal is received from the antenna unit 16 before the timer circuit 47 times out, the control circuit 42 determines that the vehicle-installed device 30 has gone out of the communication area 19 and starts the timer interruption program illustrated in FIG. 9. The control circuit 42 cancels the determination of the antenna unit 16 as a fixed communication party (step T1), invalidates the communications with the antenna unit 16 (step T2), and ends this program to return to the main communication program (see FIG. 5).

With this construction, if the vehicle-installed device 30 does not receive the next interrogation signal from the antenna unit 16 during the operation of the timer circuit 47, the vehicle-installed device 30 becomes able to receive a pilot signal PLT2 from the antenna unit 17 and set the antenna unit 17 as a fixed communication party for further communication processing while it is inside the communication area 20 (see FIGS. 10A and 10D). Thereby, the communications between the vehicle-installed device 30 and the antenna unit 17 and the toll processing will be completed by the time the vehicle-installed device 30 has passed through the communication area 20. The vehicle-installed device 30 will thus complete the communication processing before the vehicle-installed device 30 reaches the gantry 15. The second embodiment thus achieves substantially the same advantages achieved by the first embodiment and, in addition, will promptly switch the communication party to another antenna unit if reception of an interrogation signal fails after the starting of communications.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims. Examples of such changes and modifications follow.

Instead of using the timer circuit 47, the control circuit 42 may be provided with a software-implemented timer function. Further, the vehicle-installed device may be equipped with an oscillator for transmitting response signals, rather than the passive reflective modulation arrangement described above.

Besides toll collection for express roads, the invention can also be applied to parking fee collection for auto parks. This application will allow an entrance/exit design with a plurality of gates such that a plurality of vehicles can simultaneously enter and eliminates the need to stop each vehicle at the entrance and/or exit to perform fee collecting operations, thus enabling speedy entrance to and exit from the auto park and reducing manpower requirements.

In addition to tolling operations, the invention may be applied to various forms of data exchanging such as research on traffic. For example, the invention may be used for research on traffic volume for the purpose of preparation of traffic information, city traffic planning and the like. Moreover, the invention can be applied not only to a road of three lanes, but also to roads of two lanes or more than three lanes.

The vehicle-installed device may be left in operation all the time, instead of incorporating the function of waking up on reception of a pilot interrogation signal. Also, the antenna elements may employ structures other than the above-described patch structure.

What is claimed is:

1. A vehicle communication system comprising:

a plurality of antenna units provided corresponding to a plurality of communication areas for transmitting pilot signals at predetermined different timings and for transmitting interrogation signals in accordance with the transmission cycle for the pilot signals when receiving a pilot response signal;

a road-installed device for setting different timings of transmitting at least one of pilot signals and interrogation signals for at least those of the plurality of antenna units whose communication areas neighbor and overlap each other to cause those antenna units to operate in accordance with said different timings, and for identifying a vehicle passing through one of said communication areas on the basis of a signal received; and a vehicle-installed device provided in a vehicle for transmitting a pilot response signal when receiving a pilot signal from one of the antenna units and for, when receiving an interrogation signal from the same antenna unit, transmitting an interrogation response signal in response to the interrogation signal received, so as to perform communications;

wherein said vehicle-installed device includes communication control means for, when receiving a pilot signal from an antenna unit after transmitting a pilot response signal to the same antenna unit, performing control to invalidate the communications with the antenna unit and to accept a pilot signal from another antenna unit.

2. A vehicle communication system according to claim 1, wherein said communication control means is further for, when it receives no interrogation signal from an antenna unit within a predetermined length of time after transmitting a response signal for a pilot signal or an interrogation signal from the same antenna unit, invalidating the communications with the antenna unit and accepting a pilot signal from another antenna unit.

3. A communication unit comprising:

receiving means for receiving communication signals;

response signal transmitting means for transmitting response signals responsive to said communication signals received by said receiving means; and response signal prohibition means for, after said response signal transmitting means transmits a response signal responsive to reception by said receiving means of a first communication signal from a given transmitter, prohibiting said response signal transmitting means from transmitting subsequent response signals to said given transmitter when said receiving means receives a second communication signal from said given transmitter.

4. The communication unit of claim 3, further comprising communication party fixing means for establishing said given transmitter as a fixed communication party responsive to reception of said first communication signal by said receiving means and preventing said response signal transmitting means from transmitting response signals responsive to communication signals from other transmitters.

5. The communication unit of claim 4, wherein said communication party fixing means is further for cancelling said given transmitter as said fixed communication party after a predetermined period of time to permit said response signal transmitting means to respond to communication signals from other transmitters.

6. The communication unit of claim 3, further comprising:

a wait time timer initiated responsive to transmission of said response signal to measure a wait time period;

wherein said response signal prohibition means is further for preventing said response signal transmitting means from transmitting response signals to said given transmitter when said wait time timer measures said wait time period.

7. The communication unit of claim 6, further comprising communication party fixing means for establishing said given transmitter as a fixed communication party responsive to reception of said first communication signal by said receiving means and preventing said response signal transmitting means from transmitting response signals responsive to communication signals from other transmitters.

8. The communication unit of claim 3, wherein said communication unit is a vehicle-mounted unit in a toll-charging system.

9. A communication unit comprising:

receiving means for receiving communication signals;

response signal transmitting means for transmitting response signals responsive to said communication signals received by said receiving means;

communication party fixing means for establishing a given transmitter transmitting a first communication signal as a fixed communication party responsive to reception of said communication signal by said receiving means and preventing said response signal transmitting means from transmitting response signals responsive to communication signals from other transmitters; and communication party cancellation means for cancelling said given transmitter as said fixed communication party responsive to reception by said receiving means of a second communication signal from said given transmitter.

10. The communication system of claim 9, wherein said communication party cancellation means is further for cancelling said given transmitter as said fixed communication party after a predetermined period of time.

11. The communication system of claim 9, further comprising response signal prohibition means for, after said response signal transmitting means transmits a response signal responsive to reception by said receiving means of said first communication signal from said given transmitter, prohibiting said response signal transmitting means from transmitting subsequent response signals to said given transmitter when said receiving means receives said second communication signal from said given transmitter.

12. The communication system of claim 9, further comprising:

a wait time timer initiated responsive to transmission of said response signals to measure a wait time period;

wherein said communication party cancellation means is further for cancelling said given transmitter as said fixed communication party when said wait time timer measures said wait time period.

13. The communication system of claim 12, further comprising response signal prohibition means for, after said response signal transmitting means transmits a response signal responsive to reception by said receiving means of said first communication signal from said given transmitter, prohibiting said response signal transmitting means from transmitting subsequent response signals to said given transmitter when said receiving means receives said second communication signal from said given transmitter.

14. The communication unit of claim 9, wherein said communication unit is a vehicle-mounted unit in a toll-charging system.

15. A method of communicating with a communications unit, said method comprising the steps of:

receiving communication signals from said communications unit;

transmitting response signals responsive to said received communication signals; and after transmitting a response signal responsive to reception of a first communication signal from said communications unit, prohibiting transmission of subsequent response signals to said communications unit upon reception of a second communication signal from said communications unit.

16. The method of claim 15, further comprising the steps of:

establishing said communications unit as a fixed communication party responsive to reception of said first communication signal; and preventing transmission of response signals responsive to communication signals from other communications units.

17. The method of claim 15, further comprising the steps of:

timing a wait time period responsive to transmission of said response signal; and preventing transmission of response signals to said communication unit when said wait time period elapses.

18. The method of claim 17, further comprising the steps of:

establishing said communications unit as a fixed communication party responsive to reception of said first communication signal; and preventing transmission of response signals responsive to communication signals from other communications units.

19. The communication unit of claim 15, wherein said communication party fixing means is further for cancelling said given transmitter as said fixed communication party after a predetermined period of time to permit said response signal transmitting means to respond to communication signals from other transmitters.

20. A method of communicating with a communications unit, said method comprising the steps of:

receiving communication signals from said communications unit;

transmitting response signals responsive to said received communication signals;

establishing said communications unit as a fixed communication party responsive to reception of a first communication signal from said communications unit and preventing transmission of response signals responsive to communication signals from other communications units; and cancelling said communications unit as said fixed communication party responsive to reception of a second communication signal from said communications unit.

21. The method of claim 20, further comprising the steps of:

after transmission of a response signal responsive to reception of a first communication signal from said communications unit, prohibiting transmission of subsequent response signals to said communications unit upon reception of said second communication signal from said communications unit.

22. The method of claim 20, further comprising the steps of:

initiating timing of a wait time period responsive to transmission of said response signals; and cancelling said communications unit as said fixed communication party when said wait time period elapses.

23. The method of claim 22, further comprising the steps of:

after transmission of a response signal responsive to reception of a first communication signal from said communications unit, prohibiting transmission of subsequent response signals to said given transmitter upon reception of said second communication signal from said communications unit.

* * * * *